United States Patent [19]
Kato et al.

[11] Patent Number: 5,390,280
[45] Date of Patent: Feb. 14, 1995

[54] SPEECH RECOGNITION APPARATUS

[75] Inventors: Yasuhiko Kato; Masao Watari; Miyuki Tanaka; Akihiko Fujinaka, all of Kanagawa, Japan

[73] Assignee: Sony Corporation, Japan

[21] Appl. No.: 974,230

[22] Filed: Nov. 10, 1992

[30] Foreign Application Priority Data

Nov. 15, 1991 [JP] Japan .................................. 3-326933

[51] Int. Cl.[6] ........................... G10L 5/06; G10L 9/18
[52] U.S. Cl. .................................. 395/2.42; 395/2.35; 395/2.53
[58] Field of Search ..................... 381/29–51, 381/71, 94; 395/2, 2.35–2.37, 2.42, 2.52, 2.53

[56] References Cited

U.S. PATENT DOCUMENTS

| | | | |
|---|---|---|---|
| 4,811,404 | 3/1989 | Vilmur et al. | 381/94 |
| 4,852,181 | 7/1989 | Morito et al. | 395/2 |
| 5,168,524 | 12/1992 | Krocker et al. | 381/43 |
| 5,201,004 | 4/1993 | Fujiwara et al. | 381/46 |
| 5,222,147 | 6/1993 | Koyama | 395/2 |

Primary Examiner—David D. Knepper
Attorney, Agent, or Firm—Ronald P. Kananen

[57] ABSTRACT

A noise signal supplied from a microphone by way of an analog to digital converter is Fourier converted to calculate a power spectrum of the noise signal by a Fourier converting section. A system controller compares an average value of the power spectrum of the signal being outputted from the microphone at present and an average value of the power spectrum of a noise signal stored in a noise memory at present with each other. When the system controller determines that the difference between the average value of the power spectrum of the signal being outputted from the microphone at present and the average value of the power spectrum of the noise signal stored in the noise memory at present is higher than a predetermined reference value, it outputs a controlling signal to a sound storing and reading out section to store the signal being outputted from the microphone at present into the noise memory. Consequently, the signal being outputted from the microphone at present is stored into the noise memory in place of the noise signal stored in the noise signal at present.

2 Claims, 1 Drawing Sheet

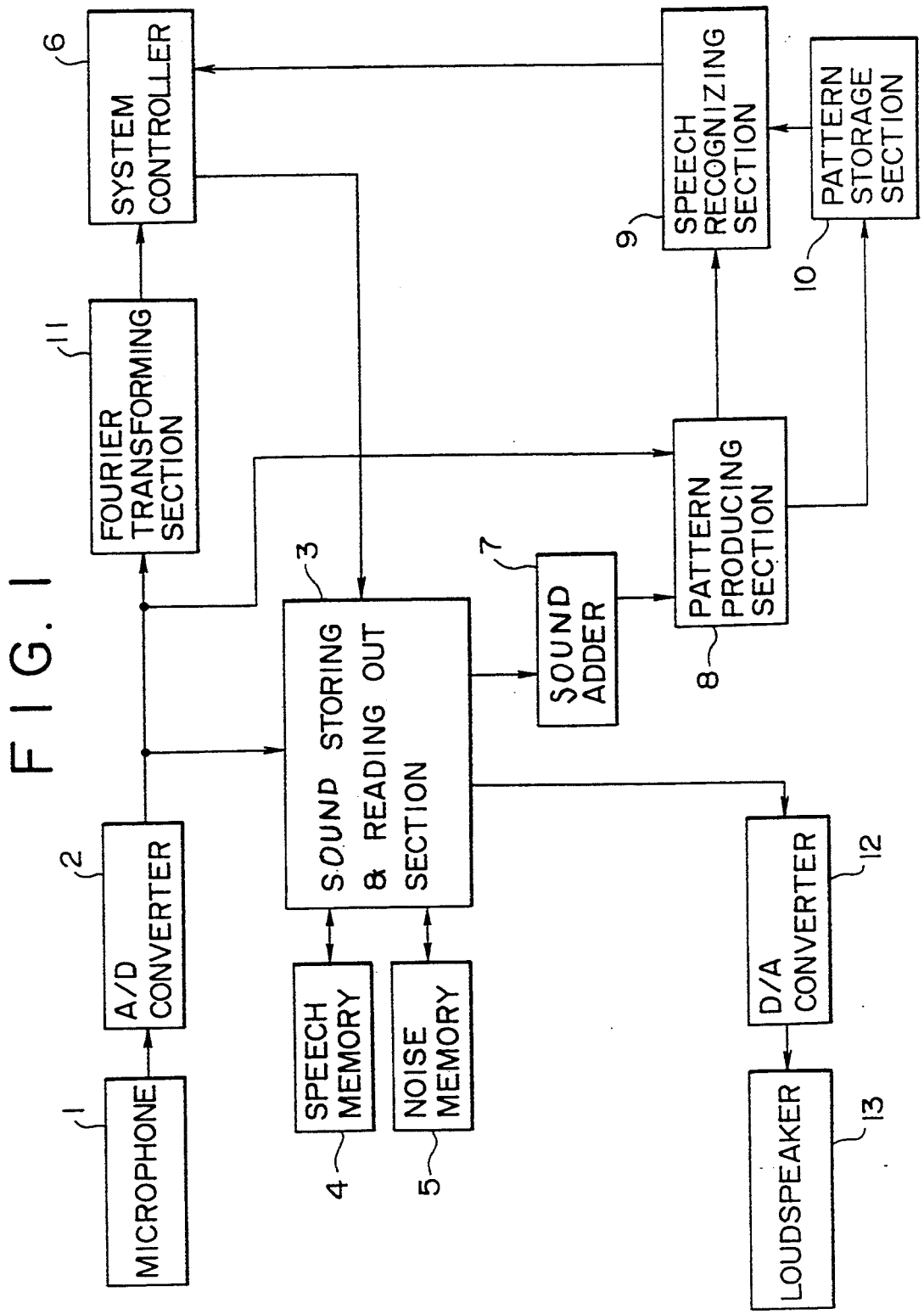

SPEECH RECOGNITION APPARATUS

BACKGROUND OF THE INVENTION

1. Field of the Invention

This invention relates to a speech recognition apparatus which is suitably applied to recognize speech.

2. Description of the Related Art

Conventionally, speech recognition devices are constructed such that a speech pattern produced using a characteristic parameter extracted from speech input to the device is successively compared with standard patterns which have been produced in advance using a characteristic parameter such as, for example, a linear forecasting coefficient extracted from speech of an arbitrary or particular speaker. Then, speech corresponding to the standard pattern which is most similar, that is, smallest in deviation, from the input speech pattern is output from the device as a result of recognition of the speech input to the device.

The speech from which the standard patterns described above are produced is normally recorded (stored) in a specific environment as, for example, a sound-proof chamber in which any sound other than the speech, that is, noise, can be eliminated. Then, the standard patterns which are produced from the speech which has been recorded in this manner have a good S/N ratio condition. However, speech recognition devices are frequently used in situations wherein noise (environmental noise) such as, for example, the sound of an engine of an automobile or voices in conversation of foot-traffic is present, than in situations wherein noise sounds are absent, such as in the manner described above. Accordingly, conventional speech recognition devices have a problem to be solved in that environmental noise may be input to the device, in addition to the speech to be recognized, and will adversely affect the recognition rate of the device.

It is already known that, in order to improve the recognition rate of a speech recognition device adversely affected by environmental noise, it may be effective to produce standard patterns in advance which include environmental noise which is likely to occur at the location at which the apparatus is to be used. However, it is unlikely that the forecast, additional environmental noise will occur steadily. Rather, environmental noise other than the forecast, additional environmental noise may occur, or the forecast, additional environmental noise may not occur. In this instance, the recognition rate of the apparatus is adversely affected.

SUMMARY OF THE INVENTION

It is an object of the present invention to provide a speech recognition apparatus which always has a high speech recognition rate.

In order to attain the object, according to the present invention, there is provided a speech recognition apparatus, which comprises an inputting means capable of inputting object speech and noise, a speech storage means for storing therein the object speech input from the inputting means, noise storage means for storing therein the noise input from the inputting means, pattern producing means for producing a speech pattern from the object speech input from the inputting means and for adding the object speech stored in the speech storage means and the noise stored in the noise storage means to produce a standard pattern, standard pattern storage means for storing therein the standard pattern produced by the pattern producing means, recognizing means for comparing the speech pattern produced by the pattern producing means with the standard pattern stored in the standard pattern storage means to recognize the object speech input from the inputting means, and updating means for causing the noise storage means to successively update the stored noise thereof in response to variations in the noise input from the inputting means.

In the speech recognition apparatus, object speech and noise input from the inputting means, such as a microphone, are stored in speech storage means and noise storage means, respectively. The pattern producing means adds the object speech and the noise thus stored to each other to produce a standard pattern. Further, the pattern producing means produces a speech pattern from the object speech input from the inputting means. The recognizing means compares the standard pattern and the speech pattern with each other to recognize the object speech. The updating means causes the noise storage means to successively update the noise stored therein in response to variations in the noise input from the inputting means. Accordingly, with the present speech recognition apparatus, a standard pattern in which noise, corresponding to the environment in which the apparatus is used, is produced. Consequently, the speech recognition apparatus can achieve a high recognition rate.

Preferably, the updating means includes detecting means for periodically detecting any variation in the noise input from the inputting means and for causing the noise storage means to successively update the stored noise thereof in response to variations in the noise detected by the detecting means. Thus, standard patterns in which a noise signal corresponding to the environment in which the apparatus is used are successively produced. Consequently, the speech recognition apparatus can achieve a high recognition rate irrespective of variations in the environmental noise. Preferably, the detecting means causes the noise storage means to update the noise stored therein when the detecting means detects a variation in the noise input from the inputting means which is greater than the first predetermined reference value. When the variation in noise input from the inputting means is greater than the first predetermined reference value the detecting means further detects whether the variation is greater than a second predetermined reference value which is higher than the first predetermined reference value. The updating means does not cause the noise storage means to update the stored noise when the detecting means detects that the variation of the noise input from the inputting means is greater than the second predetermined reference value. Thus, the noise stored in the noise storage means is updated each time the variation of the noise input from the inputting means exceeds the first predetermined reference value but is less than the second predetermined reference value. Consequently, even when a signal having an excessively high signal level is input by way of the inputting means, such as, for example, when a temporary noise is input by way of the inputting means or when speech uttered from a speaker to be recognized is input by way of the inputting means, the noise stored in the noise storage means is prevented from being updated in error. Consequently, the noise stored in the noise storage means is always updated regularly.

The speech recognition apparatus may further comprise reproducing means for reproducing the object speech stored in the speech storage means in response to a recognition result by the recognizing means. Thus, the speech recognition apparatus allows a recognition result to be readily confirmed by the user of the apparatus by means of the reproducing means. Further, the present speech recognition apparatus eliminates the necessity of providing a memory for storing speech from which a recognition result is confirmed, and consequently, the speech recognition apparatus can be produced at a reduced cost.

The above and other objects, features and advantages of the present invention will become apparent from the following description and the appended claims, taken in conjunction with the accompanying drawing.

BRIEF DESCRIPTION OF THE DRAWING

FIG. 1 is a block diagram of a speech recognition apparatus showing a preferred embodiment of the present invention.

DETAILED DESCRIPTION OF THE PREFERRED EMBODIMENT

Referring to FIG. 1, there is shown a speech recognition apparatus according to which the present invention. The speech recognition apparatus shown includes a microphone 1 which converts sound input thereto, such as speech or noise in the environment in which the apparatus is used, into an electric signal in the form of an analog signal. An analog to digital converter 2 converts the analog signal output by from the microphone 1 into a digital signal. A sound memory 4 stores therein sound (a speech signal) which is received from the microphone 1 by way of the analog to digital converter 2 and a sound storing and reading out section 3 and from which a recognition pattern is to be produced. A noise memory 5 stores therein noise (a noise signal) received from the microphone 1 by way of the analog to digital converter 2 and the sound storing and reading out section 3.

Here, noise is defined as speech and/or sound other than object speech to be recognized by the apparatus.

The sound storing and reading out section 3 is controlled by a system controller 6 so as to store a digital signal output from the analog to digital converter 2 into the speech memory 4 or the noise memory 5. Further, the sound storing and reading out section 3 reads out the speech signal or noise signal stored in the speech memory 4 or noise memory 5 and outputs the thus read out speech signal or noise signal to a sound adding section 7. Furthermore, the sound storing and reading out section 3 reads out the speech signal stored in the speech memory 4 in response to a result of recognition supplied thereto from a speech recognizing section 9 by way of the system controller 6 and outputs the thus read out speech signal to a digital to analog converter 12.

The digital to analog converter 12 converts the speech signal in the form of a digital signal read out from the speech memory 4 by the sound storing and reading out section 3 into an analog signal. A loudspeaker 13 converts the analog signal (speech signal) output from the digital to analog converter 12 into sound and outputs the sound.

The sound adding section 7 adds the speech signal and the noise signal read out respectively from the speech memory 4 and the noise memory 5 by the sound storing and reading out section 3. A pattern producing section 8 extracts a characteristic parameter such as, for example, a linear forecasting coefficient, from a signal output as a result of the combination of the speech signal and the noise signal from the sound adding section 7 and the sound signal which is received from the microphone 1 by way of the analog to digital converter 2 and which represents the object sound which includes therein noise and the speech which is to be recognized. Further, the pattern producing section 8 produces a standard pattern and a speech pattern. A pattern storage section 10 stores therein the standard pattern output from the pattern producing section 8.

The speech recognizing section 9 compares the speech pattern output from the pattern producing section 8 with a standard pattern stored in the pattern storage section 10 to effect speech recognition.

A Fourier transforming section 11 Fourier transforms the digital signal output from the analog to digital converter 2 and calculates and supplies a power spectrum of the signal after Fourier transformation to the system controller 6. The system controller 6 controls the components of the apparatus. For example, the system controller 6 controls the sound storing and reading out section 3 in response to the power spectrum supplied thereto from the Fourier transforming section 11 and a result of the recognition by the speech recognizing section 9.

We will now describe the operation of the speech recognition apparatus when a speech signal from which a standard pattern is to be produced is to be registered or stored. First, in order to notify the system controller 6 that a standard pattern is to be registered, a registration/recognition switch (not shown) is switched to the registration side. Then, in a specific location such as, for example, a sound-proof chamber in which sound other than the speech from which a standard pattern is to be produced, that is, noise, can be eliminated, predetermined speech from which a standard pattern is to be produced is input to the microphone 1. The speech input to the microphone 1 is converted into an electric signal (speech signal) and output to the analog to digital converter 2. The speech signal is converted from an analog signal into a digital signal by the analog to digital converter 2 and then supplied to the sound storing and reading out section 3. The sound storing and reading out section 3 stores the sound signal supplied thereto from the analog to digital converter 2 in the speech memory 4 in accordance with a control signal output from the system control section 6.

A speech signal of a high S/N ratio from which a standard pattern is to be produced is registered in this manner.

Now, operation of the speech recognition apparatus when recognizing speech using the thus registered speech will be described. First, the registration/recognition switch is switched to the recognition side to notify the system controller 6 that speech recognition is to be effected. Then, noise (environmental noise) input to the microphone 1 in the environment in which the apparatus is used is supplied to the sound storing and reading out section 3 and the Fourier transforming section 11 by way of the analog to digital converter 2. The sound storing and reading out section 3 stores the noise signal supplied thereto from the microphone 1 by way of the analog to digital converter 2 into the noise memory 5 in accordance with a control signal output from the system controller 6.

Meanwhile, the Fourier transforming section 11 Fourier transforms the noise signal supplied thereto from the microphone 1 by way of the analog to digital converter 2 and calculates a power spectrum. The system controller 6 calculates, for each predetermined reference period, an average value of the power spectrum supplied successively thereto from the Fourier transforms section 11. The system controller 6 compares the average value of the power spectrum of the signal currently being output from the microphone 1 with the average value of the power spectrum which was calculated when the system controller 6 supplied a control signal to the sound storing and reading out section 3 when it was storing a signal output from the microphone 1 into the noise memory 5; that is, with an average value of the power spectrum of the noise signal already stored in the noise memory 5.

When the system controller 6 determines that the difference between the average value of the power spectrum of the signal being output from the microphone 1 and the average value of the power spectrum of the noise signal already stored in the noise memory 5 is greater than a predetermined reference value A, it outputs a control signal to the sound storing and reading out section 3 to store the signal currently being output from the microphone 1 into the noise memory 5. In response to the control signal thus output from the system controller 6, the sound storing and reading out section 3 stores the signal currently being output from the microphone 1 into the noise memory 5 in place of the signal (noise signal) previously stored in the noise memory 5.

Based on the above, if a signal having an excessively high signal level is input to the microphone 1; such as, for example, when temporary noise is input to the microphone 1 or when speech uttered from a speaker to be recognized is input to the microphone 1, then the system controller 6 will determine that the difference between the average value of the power spectrum of the signal currently being output from the microphone 1 and the average value of the power spectrum of the noise signal stored in the noise memory 5 is greater than the predetermined reference value A. Consequently, the signal being output from the microphone 1, that is, the temporary noise or the speech uttered from the speaker to be recognized, will be stored into the noise memory 5 in place of the signal (noise signal) previously stored in the noise memory 5. To avoid this, when the system controller 6 determines that the difference between the average value of the power spectrum of the signal currently being output from the microphone 1 and the average value of the power spectrum of the noise signal stored in the noise memory 5 is greater than another reference value B, which is greater than the first reference value A (A<B), it determines that temporary noise or speech uttered from a speaker to be recognized has been or is being input to the microphone 1. In this instance, the system controller 1 does not output a control signal to the sound storing and reading out section 3.

In this manner, the noise (noise signal) stored in the noise memory 5 is successively updated in accordance with the variations in noise in the environment in which the apparatus is used.

Each time or after the stored contents of the noise memory 5 are updated, the noise signal stored in the noise memory 5 and the speech signal stored in the speech memory 4 and having a high S/N ratio so as to produce a standard pattern therefrom, are read out by the sound storing and reading out section 3 and supplied to the sound adding section 7. The noise signal and the speech signal (of a high S/N ratio) are added to each other at the sound adding section 7 and then supplied to the pattern producing section 8. At the pattern producing section 8, a characteristic parameter is extracted from the addition signal of the noise signal and the speech signal (having a high S/N ratio), and a standard pattern is produced from the characteristic parameter. The standard pattern thus produced is stored into the pattern storage section 10.

On the other hand, when object speech to be recognized is input to the microphone 1 together with the noise in the environment in which the apparatus is placed, it is converted from an analog signal into a digital signal by the analog to digital converter 2 and then output to the pattern producing section 8. At the pattern producing section 8, a characteristic parameter is extracted from the speech signal output from the analog to digital converter 2 which includes the noise therein, and a speech pattern is produced from the characteristic parameter thus extracted. The speech pattern is output to the speech recognition section 9. At the speech recognition section 9, the speech pattern output from the pattern producing section 8 which includes the noise therein, and the standard pattern stored in the pattern storage section 10 are compared with each other to effect recognition of the speech input to the microphone 1 which includes the noise therein. The result of the recognition is output from the speech recognition section 9 to the system controller 6.

The result of the recognition output from the speech recognition section 9 is supplied to the sound storing and reading out section 3 by way of the system controller 6. The sound storing and reading out section 3 thus reads out the speech signal corresponding to the result of the recognition from the speech memory 4 and supplies the speech signal to the digital to analog converter 12. The digital to analog converter 12 transforms the speech signal corresponding to the result of the recognition from a digital signal into an analog signal and supplies it to the loudspeaker 13. Consequently, the speech which is the result of the recognition may be confirmed when it is output from the loudspeaker 13.

As described above, and according to the speech recognition apparatus of the present invention, since a standard pattern in which the noise in the environment in which the apparatus is used which is produced in accordance with variations in the noise, the apparatus achieves an improved recognition rate for speech in which noise is included.

It is to be noted that the sound adding section 7 may be modified such that it may add a speech signal stored in the speech memory 4 and a noise signal stored in the noise memory 5 after either the speech signal or the noise signal is weighted.

Having now fully described the invention, it will be apparent to one of ordinary skill in the art that many changes and modifications can be made thereto without departing from the spirit and scope of the invention as set forth herein.

What is claimed is:

1. A speech recognition apparatus comprising:
   inputting means for inputting object speech and noise;
   speech storage means for storing object speech from said inputting means;

noise storage means for storing noise from said inputting means;

pattern producing means for producing a speech pattern from the object speech from said inputting means and for adding the object speech stored in said speech storage means and the noise stored in said noise storage means to produce a standard pattern;

standard pattern storage means for storing the standard pattern produced by said pattern producing means;

recognizing means for comparing the speech pattern produced by said pattern producing means with the standard pattern stored in said standard pattern storage means to thereby recognize the object speech from said inputting means;

updating means for causing said noise storage means to successively update the noise stored therein in response to a variation between the noise from the inputting means and the noise stored in the noise storage means exceeding a first predetermined reference value; and means for determining when the variation between the noise input from said inputting means and the noise stored in said noise storage means is greater than the first predetermined reference value and also greater than a second predetermined reference value which is higher than the first predetermined reference value, wherein said updating means does not update the noise stored in said noise storage means when said variation between the noise input from said inputting means and the noise stored in said noise storage means is greater than the second predetermined reference value.

2. A speech recognition apparatus according to claim 1, further comprising reproducing means for reproducing the object speech stored in said speech storage means in response to a recognition of object speech by said recognition means.

* * * * *